(12) United States Patent
Tsunehara (10) Patent No.: US 6,308,127 B1
(45) Date of Patent: Oct. 23, 2001

(54) METHOD AND APPARATUS FOR CONTROLLING DRIVING FORCE OF VEHICLE

(75) Inventor: Hiroshi Tsunehara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/492,157

(22) Filed: Jan. 27, 2000

(30) Foreign Application Priority Data

Jan. 27, 2000 (JP) ................................................ 11-017534

(51) Int. Cl.$^7$ ............................... B60T 8/32; B60K 28/16
(52) U.S. Cl. .............................. 701/84; 701/85; 701/90; 303/140; 303/146
(58) Field of Search ................................. 701/84, 85, 86, 701/90, 70, 72, 83; 180/197; 303/146, 140, 139, 141; 123/336, 337

(56) References Cited

U.S. PATENT DOCUMENTS

| | | | |
|---|---|---|---|
| 4,985,836 | * 1/1991 | Hashiguchi et al. | 364/426.02 |
| 5,161,106 | 11/1992 | Shiraishi et al. | 364/424.05 |
| 5,169,213 | * 12/1992 | Matsuda et al. | 303/113.2 |
| 5,255,192 | * 10/1993 | Ito et al. | 364/426.02 |
| 5,279,382 | * 1/1994 | Iwata | 180/197 |
| 5,631,837 | * 5/1997 | Fukumura | 364/431.03 |
| 5,732,380 | * 3/1998 | Iwata | 701/85 |
| 5,795,266 | * 8/1998 | Hasegawa et al. | 477/169 |
| 5,829,544 | 11/1998 | Ishizu | 180/197 |
| 5,868,474 | * 2/1999 | Abe et al. | 303/140 |
| 5,947,221 | * 9/1999 | Taniguchi et al. | 180/197 |

FOREIGN PATENT DOCUMENTS 09-280081    10/1997 (JP) .

\* cited by examiner

*Primary Examiner*—Tan Nguyen
*Assistant Examiner*—Dalena Tran
(74) *Attorney, Agent, or Firm*—Foley & Lardner

(57) ABSTRACT

In driving force controlling apparatus and method for a vehicle, the driving force controlling apparatus includes: a driver's demanding torque setting device that sets a driver's demanding torque; a slip condition detector to detect a slip condition of vehicular road wheels; a target engine torque setting device that sets a target engine torque in accordance with the slip condition; a driving force control execution determining section that determines whether the driving force control should be executed in accordance with the slip condition; and an engine output torque determining section that gives a determination of an output torque developed by an engine of the vehicle on the basis of the driver's demanding torque and the target engine torque, the engine output torque determining section determining the engines output torque determining section determining the engine output torque in accordance with the driver's demanding torque when the driving force control execution determining section negates the determination that the driving force control should be executed.

13 Claims, 3 Drawing Sheets

METHOD AND APPARATUS FOR CONTROLLING DRIVING FORCE OF VEHICLE

BACKGROUND OF THE INVENTION a) Field of the Invention

The present invention relates to apparatus and method for controlling a driving force for a vehicle. The present invention particularly relates to control apparatus and method in which an engine (output) torque is controlled in such a manner that the engine torque provides a driver's demanding torque in accordance with a driver's intention (accelerator operation situation) when no driving force control is executed, the engine torque provides a target engine torque derived from a predetermined driving force control when the driving force control is executed and which have improved reliabilities of control.

b) Description of the Related Art

It is well known that, in a case where excessive slip occurs on drive wheels during a vehicular acceleration, an opening angle of an engine throttle valve is not determined in a direct accordance with a manipulation of an acceleration by a vehicular driver but a traction control is executed such that the opening angle of the throttle valve and/or the number of engine cylinders to which an air-fuel mixture fuel supply is cut off is controlled on a basis of a target engine output torque which is derived so that the slip is suppressed and the driving force is stably transmitted on a road surface. The traction control system described above is normally abbreviated as TCS.

In addition to an engine controller which is enabled to adjust over an engine driving force to adjustably increase or decrease the opening angle of the throttle valve and the number of engine cylinders for which the fuel supply out-off is carried out, a TCS controller is provided. The TCS controller determines a slip condition of drive wheels on the basis of a difference in road wheel velocities between the drive wheels and non-drive wheels, executes the driving force control in a case where the slip condition is excessively large, calculates an appropriate opening angle of the engine throttle valve such as to enable the suppression of the excessive slip, and outputs a signal representing the calculated opening angle of the throttle valve to an engine (output) controller.

SUMMARY OF THE INVENTION

The engine controller compares the opening angle of the throttle valve to achieve the driver's demanding torque in accordance with the accelerator manipulation by the driver and that supplied from the TCS controller to achieve a target engine torque, select either one of these opening angle values which is smaller than the other (viz., either one which provides a smaller engine torque and, so-called, a select-low), and adjusts the actual opening angle of the throttle valve on the basis of the selected opening angle of the throttle valve.

As described above, the engine controller can prevent the engine torque from becoming excessively large to develop an excessive wheel slip, when the smaller value of either the driver's demanding torque or the target engine torque supplied from the TCS controller.

Furthermore, another TCS controller has been proposed in which, in a case where the slip condition of the drive wheels is not determined to be excessive (during the non-execution of the driving force), a maximum value is outputted as a signal representing the opening angle of the throttle valve. In other words, even if the value of the signal representing the opening angle of the throttle valve provides the maximum value, the selection method of the select-low has been adopted in the engine controller so that the opening angle of the engine throttle valve is selected which is in accordance with the driver's demanding torque. Therefore, the engine driving force will not becomes excessive irrespective of the accelerator manipulation by the vehicular driver, during the non-execution of the driving force since the opening angle of the throttle valve in accordance with the driver's demanding torque.

It is assured that if the above-described selection method (select-low) is adopted in the engine controller to which the output signal from the TCS controller is supplied, the excessive torque of the engine can be prevented and a possibility of generating the excessive slip during the vehicular acceleration can be reduced.

However, the inventor has discovered according to the inventor's research that the selection method of the select-low is inconvenient for the driving forces control. That is to say, the select-low method always selects either one of these signals which is smaller than the other. In details, if the driver's demanding torque is larger than the target engine torque supplied from the TCS controller, the target engine torque is selected. On the contrary, if the target engine torque is larger than the driver's demanding torque, the driver's demanding torque is selected. Hence, in a case where it is necessary to output a large engine torque than the driver's demanding torque as the result of the calculation for the driving force control, the select-low method cannot cope with this case.

Therefore, it becomes necessary to select the signal used in the engine controller in response to another signal (a driving force control request signal) supplied from the TCS controller, not through the select-low method described above, In details, such a control structure may be considered that when the TCS controller executes the driving force control, the driving force control request signal having a logical value of "1" is generated and when the TCS controller does not execute the driving force control, the driving force control request signal having the logical value of "0" is generated. Then, the engine controller selects the driver's demanding torque in accordance with the vehicular driver's demanding (accelerator manipulation) when the driving force control request signal is at the logical value of "0" and selects the target engine torque supplied from the TCS controller when the driving force control request signal is at the logical value of "1".

If the above-described control structure is adopted, the selection of the signal within the engine controller can be controlled at the TCS controller side. Therefore, such as inconvenience as the case where the select-low method is adopted can be eliminated. However, since the receipt and transmission of the signal are carried out between the TCS controller and engine controller via harness, there is a possibility that the logical value of the driving force control request signal is reversed due to surrounding noises.

If the logical value of the driving force control request signal were reversed during the non-execution of the driving force, the engine controller would select the target engine torque supplied from the TCS controller and the driving force of the engine would be controlled according to the value set as the instantaneous target engine torque.

It is, hence, an object of the present invention to provide apparatus and method for controlling an engine driving force for a vehicle.

The above-described object can be achieved by providing a driving force controlling apparatus for a vehicle, comprising: a driver's demanding torque setting device that sets a torque that a vehicular driver is demanding: a slip condition detector to detect a slip condition of vehicular road wheels; a target engine torque setting device that sets a target engine torque in accordance with the slip condition; a driving force control execution determining section that determines whether the driving force control should be executed in accordance with the slip condition; and an engine output torque determining section that gives a determination of an output torque developed by an engine of the vehicle on the basis of the driver's demanding torque and the target engine torque, the engine output torque determining section determining the engine output torque in accordance with the driver's demanding torque when the driving force control execution determining section negates the determination that the driving force control should be executed.

The above-described object can also be achieved by providing a driving force controlling method for a vehicle, comprising: setting a torque that a vehicular drier is demanding; detection a slip condition of vehicular road wheels; setting a target engine torque in accordance with the slip condition; determining whether the driving force control should be executed in accordance with the slip condition; and giving a determination of an output torque developed by an engine of the vehicle on the basis of the driver's demanding torque and the target engine torque, wherein, at the engine output torque determining step, the engine output torque is determined to be in accordance with the driver's demanding torque when, at the driving force control execution determining step, the determination that the driving force control should be executed is negated.

DETAILED DESCRIPTION OF THE PREFERRED EMBODIMENT

Reference will hereinafter be made to the drawings in order to facilitate a better understanding of the present invention.

FIGS. 1A through 3B show a preferred embodiment of a driving force controlling apparatus according to the present invention.

Figure 1A:
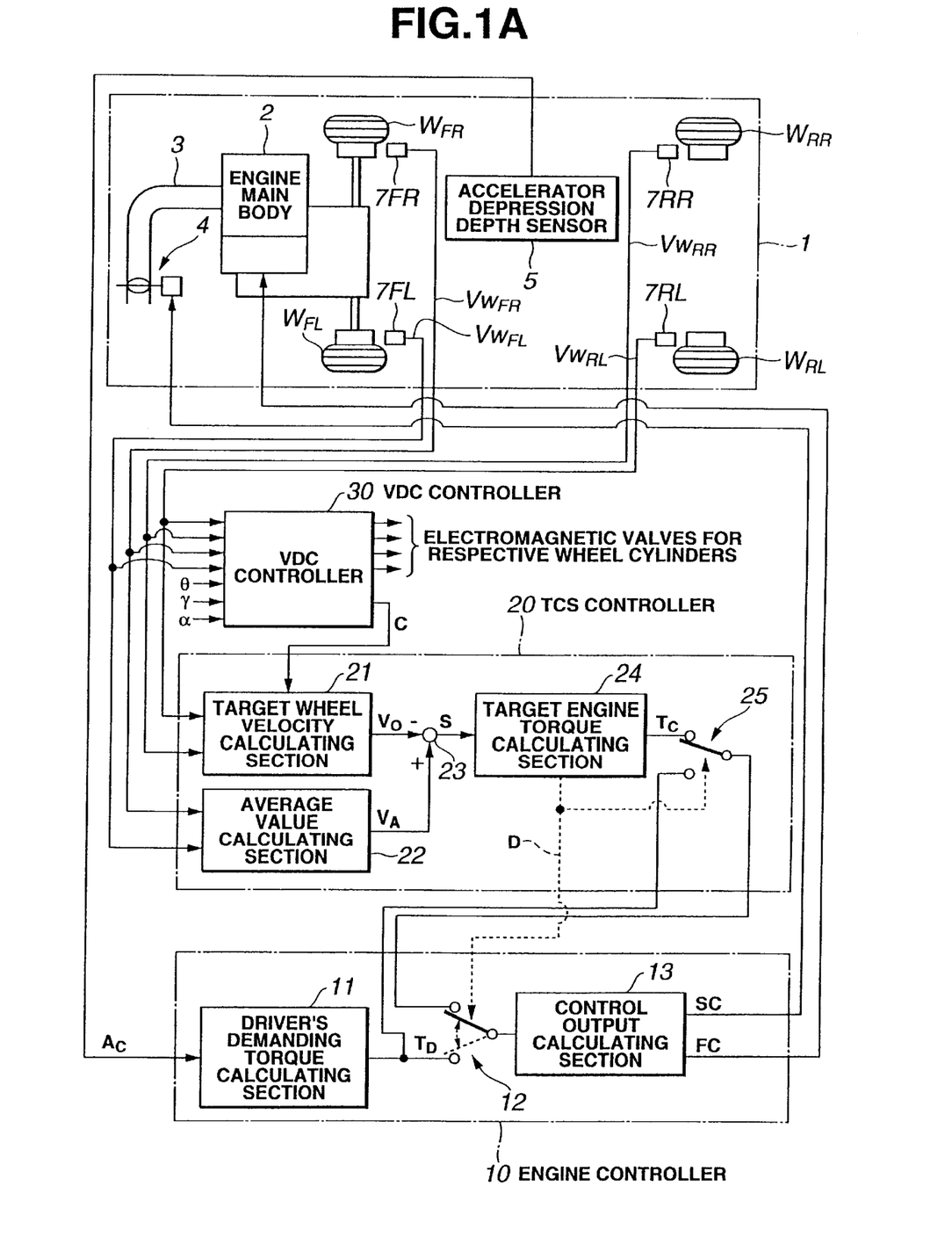
FIG. 1A is a schematic functional block diagram or a driving force controlling apparatus in a preferred embodiment according to the present invention.

The driving force controlling apparatus in the preferred embodiment shown in FIG. 1A is applicable to an automotive vehicle 1 in which a TCS (Traction Control System) and a VDC (Vehicle Dynamic Control System) are mounted.

As shown in FIG. 1A, the vehicle 1 is a, so-called, FF (Front-Engine-Front-Drive) vehicle in which a driving force of the engine 2 is transmitted to front road wheels $W_{FL}$ and $W_{FR}$ as drive wheels and rear left and right road wheels $W_{RL}$ and $W_{RR}$ are non-driven wheels.

An electronically controlled throttle valve 4 are interposed in an intake air passage 3 of the engine 2. An opening angle of the throttle valve 4 is controlled in response to a throttle opening angle control signal SC supplied from an engine controller 10. In addition, a number of cylinders by which an air-mixture fuel supply is cutoff from among a plurality of cylinders of the engine 2 are controlled in response to a fuel cut-off control signal FC supplied from the engine controller 10.

The vehicle 1 includes an accelerating manipulation sensor 5 to detect a manipulated variable (viz., a depression depth) of an accelerator pedal by a vehicular driver and to output an accelerator opening angle signal AC representing the depression depth of the accelerator pedal; and road wheel velocity sensors 7FL, 7FR, 7RL, and 7RR to detect respective road wheel velocities VwFL, VwFR, VwRl, and VwRR of front left and right road wheels $W_{RF}$, $W_{FR}$, $W_{RL}$, and $W_{RR}$.

On the other hand, the engine controller 10 generally includes a microcomputer having a CPU (Central Processing Unit), a RAM (Random Access Memory), a ROM (Read Only Memory), an Input Port, an Output Port, and a common bus. A functional structure of the engine controller 10 is shown in FIG. 1A. However, the functional structure of the engine controller 10 shown in FIG. 1A is related to only that essential to the preferred embodiment.

The engine controller 10 functionally includes a driver's demanding torque calculating section 11. The driver's demanding torque calculating section 11 receives the accelerator opening angle signal Ac. The driver's demanding torque calculating section 11 calculates a driver's demanding torque $T_D$ in accordance with the driver's intention on the basis of the accelerator opening angle signal Ac and outputs a signal (a driver's demanding torque signal) and outputs the $T_D$ representing the calculated driver's demanding torque.

The driver's demanding torque signal $T_D$ is supplied to one input end of a first switching section 12. An output end of the switching section 12 is connected to an input end of a control output calculating section 13. The control output calculating section 13 derives the opening angle of the throttle valve 4 and the number of cylinders for which the fuel supply cut-off is carried out required to achieve the engine torque represented by the signal supplied from the switching section 13, generates a throttle control signal SC and the fuel cut-off control signal FC corresponding to the throttle opening angle and to the number of the cylinders for which the fuel supply cut-off is executed, and outputs the respective signals SC and FC to the throttle valve 4 and the engine 2.

Figure 1B:
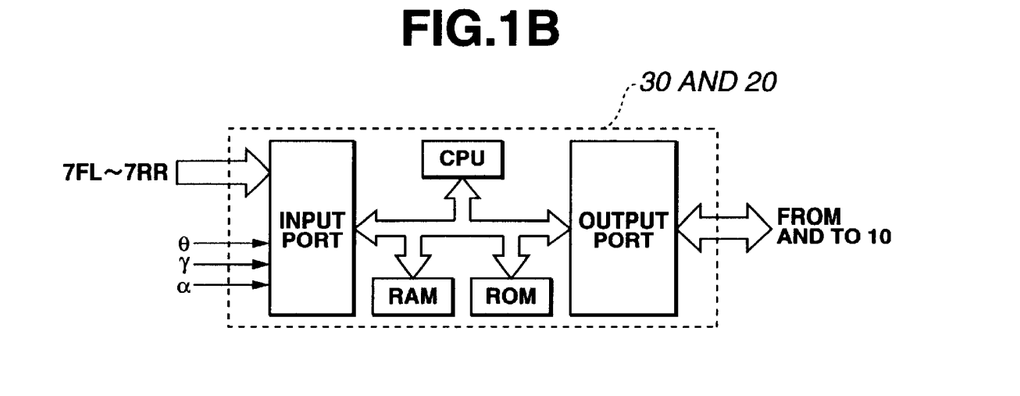
FIG. 1B is a schematic circuit block diagram of a TCS controller shown in FIG. 1A.

In this embodiment, in addition to the engine controller 10, a TCS controller 20 and a VDC controller 30 are installed. The TCS controller 20 generally includes a microcomputer having the CPU, RAM, ROM, I/O Ports, and the common bus as shown in FIG. 1B.

The VDC controller 30 includes the microcomputer having the same hardware structure as the TCS controller 20.

The TCS controller 20 includes a target road wheel velocity calculating section 21 that receives the road wheel velocity signals $V_{WRL}$ and $V_{WRR}$ from the road wheel velocity sensors $7_{RL}$ and $7_{RK}$ for the rear road wheels $W_{RL}$ and $W_{RR}$ as the non-driven wheels, calculates are average value of the road wheel velocities $V_{MRL}$ and $V_{MRR}$ and multiples the average value, for example, by a predetermined constant to derive a target road wheel velocity $V_0$ of the drive wheels $W_{FL}$ and $W_{PR}$; an average value calculating section 22 that receives the road wheel velocity signals $V_{WFL}$ and $V_{WFR}$ from the road wheel velocity sensors $7_{FL}$ and $7_{FR}$ for the front left and right road wheels $W_{FL}$ and $W_{RF}$ as the drive wheels; and a slip rate calculating section 23 that calculates a slip rate S on the front road wheels $W_{FR}$ and $W_{FL}$ with respect to an ideal road wheel velocity.

Furthermore, the TCS controller 20 includes a target engine torque calculating section 24 that calculates a target engine torque Tc on the basis of the slip rate S and outputs a signal representing the target engine torque Tc (a target engine torque signal). The target engine torque calculating section 24 includes a calculator to calculate an absolute value of the slip rate S and a comparator to calculate an absolute value |S| of the slip rate S with a predetermined threshold value S* (<0) so as to determine whether the absolute value |S| of the slip rate is in excess of the predetermined threshold value S*. The predetermined threshold value S* is a value above which the slip rate of the front left and right road wheels $W_{FL}$ and $W_{FR}$ is considerably excessive.

If $|S| \leq S^*$, the target engine torque calculating section 24 zeros the target engine torque Tc. If $|S|>S^*$, the target engine torque calculating section 24 calculates and outputs the target engine torque Tc which is appropriate to suppress the excessive slip.

The target engine torque signal Tc is supplied to one input end of a second switching section 25 within the TCS controller 20 and an output end of the second switching section 25 is connected to the other input end of the second switching section 12 of the engine controller 10 via an interface circuit and a hardness.

The target engine torque calculating section 24 determines that the driving force control is not executed in a case where the slip rate S is not in excess of the predetermined threshold value S* and generates and outputs a driving force control request signal D having the logical value of "0". If $|S|>S^*$, the target engine torque calculating section 24 determines that the driving force control should be executed and generates and outputs the drive force control request signal D having the logical value of "1".

The driving force control request signal D is supplied to the second switching section 25 within the controller 20 and supplied to the first switching section 12 with the engine controller 10 via the interface circuit and/or the harness. The switching state of the first and second switching sections 12 and 25 are controlled in response to the state of the driving force control request signal D.

It is noted that the driver's demanding torque signal $T_D$ outputted from the driver's demanding torque calculating section 11 within the engine controller 10 is supplied to the other input end of the second switching section 25 via the interface circuit and the harness.

The switching operation of each of the first and second switching sections 12 and 25 based on the driving force control request signal D will be described below.

That is to say, when the driving force control request signal D is at a logical value of "1" (during the execution of the driving force control), the first switching section 12 selects one (the output of the TCS controller 20 ) of the output signals of the second switching section 25 which is inputted thereto (viz., the state of switching as shown in FIG. 1A with the bold line). The second switching section 25 selects the input side at which the target engine torque signal Tc is inputted (viz., the state of switching as shown in FIG. 1A).

On the other hand, when the driving force control request signal D is at the logical value of "0" (during the non-execution of the driving force control ), the first switching section 12 selects one of the two input ends to which the driver's demanding torque signal $T_D$ is inputted (a state in the reverse state to that shown in FIG. 1A, viz., a dot line denoting portion) so that the second switching section 25 selects one of the input ends thereof which is derived from the engine controller 10 (the reversed state to FIG. 1A, viz., a movable contact to which the output and of the driver's demanding torque calculating section 11 is connected (the reversed state shown in FIG. 1A).

On the other hand, the VDC controller 30 receives the respective road wheel velocity signals VwFL through VwRR, a steering angular displacement detection signal θ from a steering angle sensor (not shown), a yaw rate detection signal γ from a yaw rate sensor to detect a yaw rate (yaw velocity) of the vehicle body; and a lateral acceleration detection signal α from a lateral acceleration sensor to detect a lateral acceleration or the vehicle body, respectively.

The VDC controller 30 calculates a target yaw rate on the basis of each signal inputted thereto, derives a target value of the road wheel velocity for each road wheel, outputs the control signal to an electromagnetic valve of wheel cylinders for each road wheel, and outputs a correction signal C for the target road wheel velocity calculating section 21.

The target road wheel velocity calculating section 21 is responsive to the incoming correction signal C to correct the target road wheel velocity $V_0$ on the basis of the correction signal C. That is to say, the target road wheel velocity calculating section 21 generates a post-correction target road wheel velocity $V_0$ with the original target road wheel velocity derived on the basis of the road wheel velocity signals $V_{WRL}$ and $V_{WKK}$ on the non-driven wheels by increasing or decreasing the original target wheel velocity $V_0$ by a value corresponding to the correction signal C. In details, since the original target vehicular velocity $V_0$ is derived on the basis of the road wheel velocities $V_{WRL}$ and $V_{WRE}$ on the non-drive wheels, the original target road wheel velocity $V_0$ is merely a target road wheel velocity on the drive wheels to make the slip condition most appropriate.

Whereas, the VDC controller 30 derives the target road wheel velocity of each road wheel for obtaining desired whole vehicle behavior. However, the original target road wheel velocity $V_0$ is corrected with the correction signal C so that the target road wheel velocity $V_0$ is derived in which the target road wheel velocity $V_0$ to control the slip condition. Then, the slip rate S on the basis of the final target road wheel velocity is derived and the target engine torque Tc is derived. Hence, the target engine torque Tc is the integrated value of the target engine torque to control the slip condition and that to control the vehicular posture.

Next, on operation of the apparatus for controlling the driving force for a vehicle will be described below.

Figure 2:
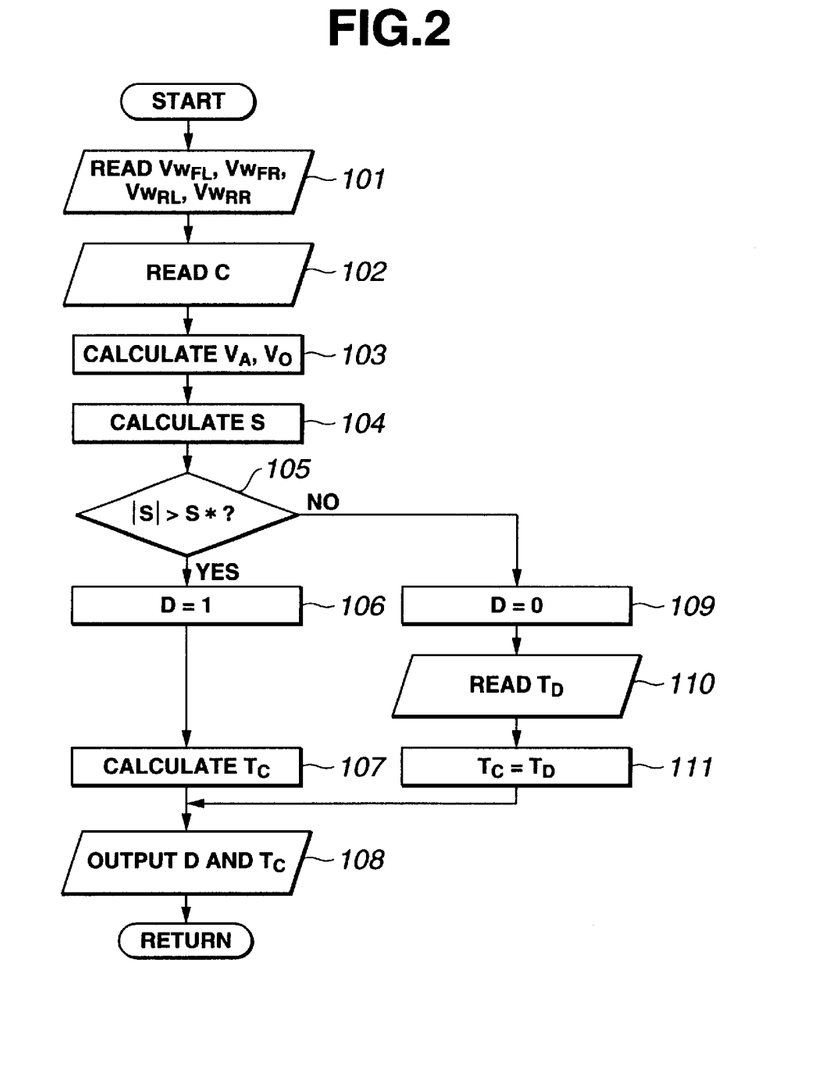
FIG. 2 is an operational flowchart executed in the TCS controller shown in FIGS. 1A and 1B.

FIG. 2 is an operational flowchart representing a concept of processing executed in the TCS controller 20.

Figure 3A:
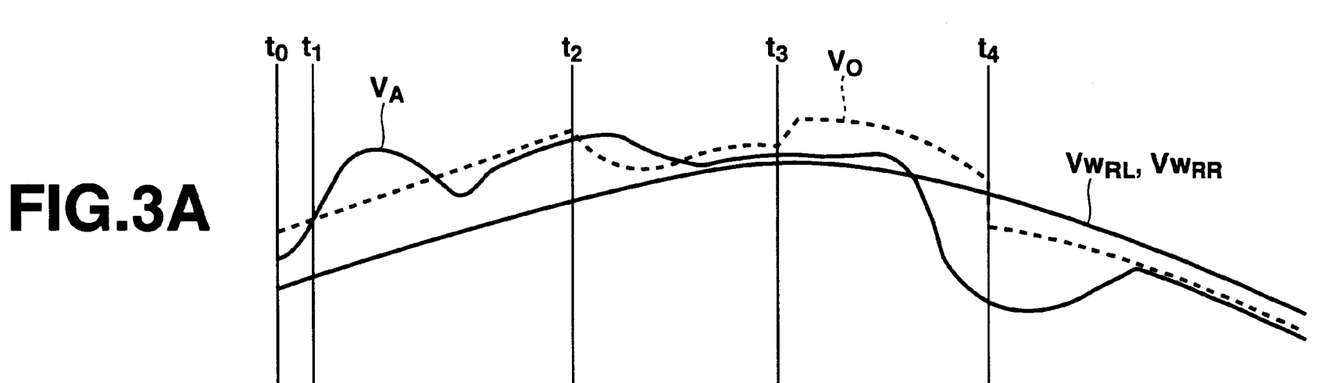
FIGS. 3A and 3B are integrally a waveform chart representing an average value and a target value of road wheel velocity $V_A$ and $V_0$, a drier 's demanding torque signal $T_D$, and a target engine torque signal $T_C$ for explaining an operation of the driving force controlling apparatus in the preferred embodiment shown in FIGS. 1A and 1B.
Figure 3B:
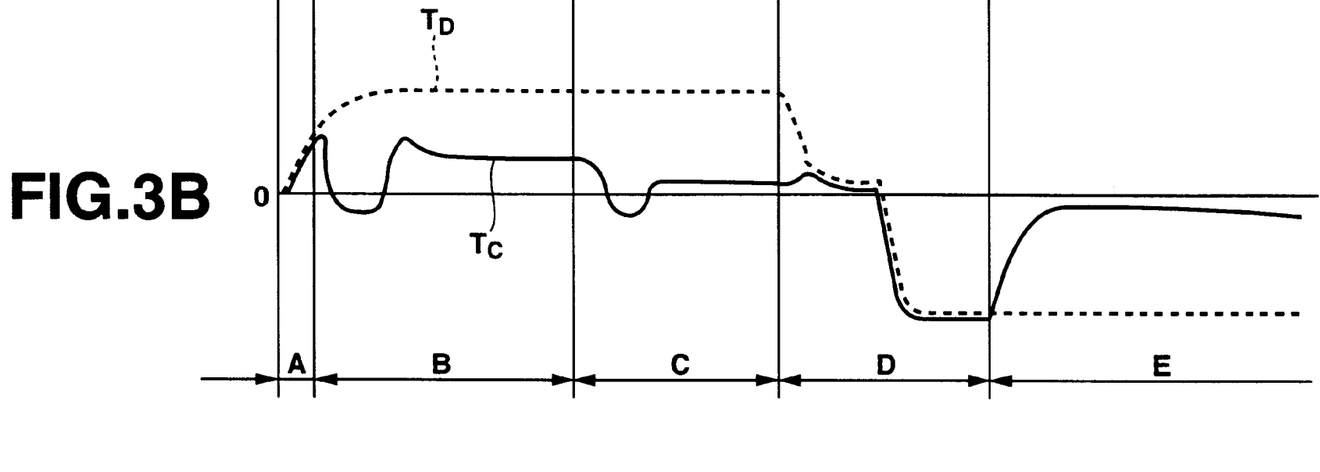

FIGS. 3A and 3B are waveform charts for explaining a variation in each signal described above.

At step 101, the CPU of the TCS controller 20 reads the respective road wheel velocity signals $V_{WFL}$, $V_{WFR}$, $V_{WRL}$, and $V_{WRR}$. At step 102, the TCS controller 20 reads the correction signal C from DVC controller 30. At step 103, the TCS controller 20 calculates the average value $V_A$ and the target road wheel velocity $V_0$. At step 104, the TCS controller 20 calculates the slip rate S on the basis of the average value $V_A$ and the target road wheel velocity $V_0$. Then, the routine goes to step 105.

At step 105, the TCS controller 20 compares the absolute value of the slip rate S with the predetermined threshold value S* so as to determine if the absolute value |S| of the slip rate S is in excess of the predetermined threashold value S8. If the TCS controller 20 determines that |S|<s* (Yes) at step 105, the routine goes to step 106. At the step 106, the driving force request signal D is set to "1". Then, the routine goes to stop 107. At step 107, the TCS controller 20 calculates the target engine torque Tc on the basis of the slip rate S. Then, the routine goes to step 108. At step 108, the TCS controller 20 outputs the driving force request signal D and the target engine torque signal Tc.

In this case, as the target engine torque signal Tc, the target engine torque Tc is outputted which is calculated at step 107. After step 108, the present routine of FIG. 2 is ended.

On the other hand, if the TCS controller 20 determines that the absolute value of the slip rate |S| is equal to or smaller than the predetermined threshold value S* (No), the routine goes to step 109 to set the driving force control request signal D to "0", and the routine goes to step 110. At step 110, the TCS controller 20 reads the driver's demanding torque signal $T_D$ supplied from the engine controller 10. Then, the routine goes to step 111 in which the driver's demanding torque signal $T_D$ is assigned to the target engine torque signal Tc (To=$T_D$). Then, the routine goes to step 108. In this case, when executing the process of step 108, the driver's demanding torque signal $T_D$ is actually outputted as the target engine torque signal Tc.

Next, the whole operation shown in FIG. 1A will be described with reference to FIGS. 3A and 3B.

Suppose that, at a time point of $t_c$ shown in FIGS. 3A and 3B, the vehicle 1 is started to raise a vehicular velocity gradually and the average value $V_A$ of the wheel velocities of the drive wheels is in excess of the target road wheel velocity $V_0$ at a time point $t_1$. At this time, since, during a time interval (time interval A in FIG. 3B) from the time point $t_0$ to the time point $t_1$, the determination at the step 105 of FIG. 2 indicates No. Therefore, the driver's demanding torque signal $T_D$ is outputted as the target engine torque signal Tc. In other words, the target engine torque Tc denoted by the solid line at the time interval or A in FIG. 3B is varied together the driver's demanding torque $T_D$ denoted by a dot line in FIG. 3A.

Since, during the time interval of A, the driving force control request signal D is turned to "0", the switching section 12 of the engine controller 10 is in its reversed state to FIG. 1A (to a position as denoted by the dot line in FIG. 1A). The driver's demanding torque signal $T_D$ is directly supplied to the control output calculating section 13 so that the throttle control signal SC and the fuel supply out-off control signal FC are generated and outputted.

Therefore, the opening angle of the throttle valve 4 and the number of cylinders by which the fuel supply is cut off are adjusted to a state in accordance with the driver's intention and the vehicle 1 is continued to be accelerated.

After the time point $t_1$ is passed, the average value $V_A$ is in excess of the target road wheel velocity $V_0$. Hence, since the slip rate S is gradually increased, the determination at the step 105 indicates "Yes" at a certain time point after the time point $t_1$ so that the process at the step 107 is executed to calculate the target engine torque Tc. In details, as denoted by a time interval B shown in FIG. 3B, the target engine torque Tc indicates a value different from the driver's demanding torque $T_D$.

At an initial part of time in the time interval B, the target engine torque TC goes negatively (the engine brake is effected) to suppress the excessive slip at its earlier stage of time. The average value $V_A$ become a value smaller than the target road wheel velocity $V_0$ in a relatively short time interval, as shown in the time interval of B in FIG. 3A.

Then, before the average value $V_A$ is excessively smaller than the target road wheel velocity $V_0$, the target engine torque Tc is recovered. Thereafter, the average value $V_A$ becomes approximately equal to the target read wheel velocity $V_0$.

When it reaches to a time point $t_2$, the VDC control is started. As shown in a time interval C in FIG. 3A, the target road wheel velocity $V_c$ is corrected so as to be decreased. At this time, along with the decrease in the target road wheel velocity $V_0$, the slip rate S is increased.

Upon receipt of the increase in the slip rate S, the target torque Tc is decreased.

Along with the decrease n the target engine torque Tc, the average value $V_A$ is decreased to become substantially equal to the target road wheel velocity $V_o$, as shown by an intermediate portion of the time interval C shown in FIG. 3A. Thereafter, the target engine torque Tc is again increased to become slightly larger than zero.

When it reaches to a time point $t_3$ and at this time the vehicle driver, in turn, pulls the accelerator pedal from the depression direction to a release direction (the opening angle of the accelerator is reduced), the driver's demanding torque $T_D$ is decreased as shown by a first part of the time interval D in FIG. 3B. Then, as a result of an elimination of the correction signal C according to the end of the VDC control, the target road wheel velocity $V_0$ is again enlarged as shown by a first part of the time interval D in FIG. 3A.

Since the driver holds the state of the accelerator opening angle at a time point at which the engine torque is approximately zeroed, the driver's demanding torque $T_D$ (as denoted by a dot line in FIG. 3B) indicates generally a parallel to a zero level (0) with a small plus separation state from the zero level as shown at generally a center position of the time interval D in FIG. 3B.

Furthermore, as shown at a later half portion of the time interval D in FIG. 3B, since the driver returns again the opening angle of the accelerator to the release direction, the driver's demanding torque $T_D$ is largely decreased. It is noted that since both the TDC control and the VDC control are stopped immediately after the passage of the time point $t_3$ at the time interval D in FIG. 3B, the target engine torque Tc is varied together with the driver's demanding torque $T_D$.

The driver's demanding torque $T_D$ is largely decreased so that the opening angle of the throttle valve and the number of fuel out-off cylinders are accordingly adjusted. At this time, a large engine braking abruptly occurs. Hence, this results in a large deceleration of the vehicle. At this time, if the deceleration were excessively large, there would be possibility for the vehicular behavior to be undersirable.

To prevent this undesirable vehicular behavior, the VDC control is re-opened. As shown at the time interval D in FIG. 3A, the target road wheel velocity $V_0$ is gradually decreased in the road wheel velocities VwRL and wVwRR of the non-drive wheels abruptly drops to a lower value at a time point $t_4$ and, thereafter, is held at a value higher than the average value $V_A$.

Hence, as shown at a time interval E of FIG. 3B, the target engine torque Tc is negatively larger than zero at an initial time of the time interval E, is exponentially reduced toward zero, and settled at a negatively small value along the zero level which does not generate the excessive engine braking. On the other hand, the driver's demanding torque $T_D$ gives constantly a negatively large value along the time interval E.

At a time point after the time point $t_4$, the absolute value of the clip rate S becomes large and the determination at the step 105 indicates Yes and the driving force control request signal D is set to "1". The engine controller 10 selects the target engine torque signal Tc to execute the control over the driving force. The engine torque is recovered. As shown by the time interval E of FIG. 3A, the average value $V_A$ is once raised and, thereafter, is reduced gradually.

As described above, in the embodiment, the engine controller 10 does not adopt the select-low method as described in the SUMMARY OF THE INVENTION but adopts the selection of the signal from among those signals inputted to the control output calculating section 13 in accordance with the driving force control request signal D. Hence, in a case where it becomes necessary to increase the driving force as shown by the time interval E in FIGS. 3A and 3B, the engine controller 10 can respond to this demand without failure.

Since, in the preferred embodiment, the driver's demanding torque $T_D$ is outputted as the target engine torque signal Tc when the driving force control is not executed, a more reliability can be increased. In other words, since only the driver's demanding torque $T_D$ is required during the non-execution of the driving force control (the time interval A and the time interval D in FIGS. 3A and 3B), the target engine torque signal Tc is theoretically unnecessary which is supplied from the TCS controller 20 to the engine controller 10. However, in the actual practice, the TCS controller 30 and the engine controller 10 have separate microcomputers and both controllers 20 and 10 are connected electrically to each other via the interface circuit and harness. Hence, there is a possibility that the level of the driving force control request signal D due to the noise interference and the switched state of the first switching section 12 is changed although it is in a very short period of time. It is noted that the second switching section 25 is achieved by a programming in the TCS controller 20 together with the target engine torque calculating section 24 generating the driving force control request signal D, an unintentional switching thereof due to the noise interference would not be made.

If the unintentional switching occurs in the first switching section 12, the control output calculating section 13 receives the target engine torque Tc. However, if so, the second switching section 25 is the reversed state to that shown in FIG. 1A. Therefore, the control output calculating section 13 is at least supplied with the driver's request torque signal $T_D$ so that such a situation that the engine torque which does not meet with the intention of the driver in spite of the non-execution of the driving force is avoided from occurring and the reliability can accordingly be improved.

It may be considered that the second switching section 25 is provided so that the first switching section 12 can be omitted and the output end of the second switching section 25 may directly be supplied to the control output calculating section 18. However, if so, the driver's demanding torque $T_D$ would always be supplied to the control output calculating section 13 via the TCS controller 20. Accordingly, a delay in control might occur. Therefore, the structure as shown in the preferred embodiment is desirable.

In the preferred embodiment, the accelerator manipulation (opening angle) sensor 5 and the driver's demanding torque calculating section 11 corresponds to the driver's demanding torque signal generating means.

The target road wheel velocity calculating section 21, the average value calculating section 22, the slip rate calculating section 24, the second switching section 25, and the steps 101 through 105, 107, 110, and 111 correspond to target engine torque signal generating means, the target engine torque calculating section 24 and the steps 105, 106, and 109 corresponding to driving force control request signal generating section, the first switching section 12 corresponds to signal selecting means, and the control output calculating section 13 corresponds to engine torque controlling section.

In the above-described embodiment, as the driver's request torque signal, the driver's request torque itself is used. Together with the driver's demanding torque, the proper target engine torque is used as the target engine torque signal representating the target engine torque. However, the driver's demanding torque and the target engine torque may be represented by the throttle opening angle or the number of the cylinders for which the fuel supply cut-off is carried out. These throttle valve opening or the number of fuel cut-off cylinders may be used to communicate between the controllers 10 and 20 as the driver's demanding signal and the target engine torque signal.

In the preferred embodiment, the VDC controller 30 is provided. However, in place of the VDC controller 30 an anti-lock brake system (so-called, ABS) controller may be installed to correct the target road wheel velocity VO according to the output of the ABS controller. Or alternatively, the ABS controller may be installed together with the VDC controller 30.

The entire contents of a Japanese Patent Application No. Heisei 11-017534 (filed in Japan on Jan. 26, 1999) are herein incorporated by reference.

Although the present invention has been described above by reference to certain embodiments of the present invention, the present invention is not limited to the embodiments described above.

Modifications and variations of the embodiments described above will occur to those skilled in the art, in the light of the above teachings. The scope of the present invention is defined with reference to the following claims.

What is claimed is:

1. A driving force controlling apparatus for a vehicle, comprising:
    a driver's demanding torque setting device that sets a torque that a vehicular driver is demanding;
    a slip condition detector to detect a slip condition of vehicular road wheels;
    a target engine torque setting device that sets a target engine torque in accordance with the slip condition;
    a driving force control execution determining section that determines whether the driving force control of should be executed in accordance with the slip condition; and
    an engine output torque determining section that gives a determination of an output torque developed by an engine of the vehicle on the basis of the driver's demanding torque and the target engine torque, the target engine torque setting device outputting a value of the target engine torque to which the driver's demanding torque is assigned when no driving force control is determined to be executed.

2. A driving force controlling apparatus for a vehicle as claimed in claim 1, wherein the engine output torque determining section further includes a selecting section that selects one or both of the driver's demanding torque and the target engine torque and the engine output torque determining section determines the engine output torque according to the selected one of the driver's demanding torque and the target engine torque.

3. A driving force controlling apparatus for a vehicle as claimed in claim 1, wherein the target engine torque indicates an integrated value of a first target engine torque to control the slip condition of the road wheels and a second target engine torque to control a vehicle posture.

4. A driving force controlling apparatus for a vehicle as claimed in claim 3, wherein the slip controller detector includes a plurality of road wheel velocity sensors to detect road wheel velocities of respective road wheels; a target road wheel velocity calculating section that calculates a target road wheel velocity $V_0$ on drive wheels on the basis of the road wheel velocities; an average value calculating section that calculates an average value $V_A$ of the road heel velocities on the non-drive wheels; and a subtractor to subtract the average value $V_A$ from the target wheel velocity $V_0$ to derive a slip rate S.

5. A driving force controlling apparatus for a vehicle as claimed in claim 4, wherein the driving forces control determining section includes an absolute value calculator to calculated as absolute value $|S|$ of the slip rate; a comparator to compare the absolute value $|S|$ of the slip rate with a predetermined threshold value $S^*$ to determine whether the absolute value $|S|$ is in excess of the predetermined threshold value; and a driving force control request signal generator to generate and output a driving force control request signal D having a logical value of "1" when the comparator determines that the absolute value of $|S|$ is in excess of the predetermined threshold value $S^*$ and having a logical value of "0" when the absolute value thereof $|S|$ is equal to or smaller than the predetermined threshold value $S^*$.

6. A driving force controlling apparatus for a vehicle as claimed in claim 5, wherein the selecting section includes a first switching section having a first input end connected to the driver's demanding torque setting device to receive the driver's demanding torque $T_D$, a second input end thereof connected to an output end of a second switching section to receive either the driver's demanding torque $T_D$ from the driver's demanding torque setting device or the target engine torque from the target engine torque setting device, and an output end connected to the engine output torque detecting section, the first switching section being driven to connect the output end thereof with one of the first and second input ends depending on the logical value of the driving force control request signal.

7. A driving force controlling apparatus for a vehicle as claimed in claim 6, wherein the second switching section includes a first input and connected to the target engine torque setting device to receive the target engine torque Tc, a second input and connected to the first input end of the first switching section, and an output end connected to the second input end of the first switching section.

8. A driving force controlling apparatus for a vehicle as claimed in claim 7, wherein the first switching section is installed in an engine controller and the second switching section is installed in a TCS controller and both of the switching sections are connected to each other.

9. A driving force controlling apparatus for a vehicle as claimed in claim 7, wherein in response to the driving force control request signal D indicating the logical value of "1", the output end of the second switching section of is connected to the first, input end of the second switching section and the output end of the first switching section is connected to the second input and thereof.

10. A driving force controlling apparatus for a vehicle s claimed in claim 9, wherein in response to the driving force control request signal D indicating the logical value of "0", the second input end of the second switching section is connected to the output end of the second switching section and the first input end of the first switching section is driven to the connected to the output end thereof.

11. A driving force controlling apparatus for a vehicle as claimed in claim 10, further comprising a VDC controller that generates a correction signal C related to a vehicular posture and wherein the target road wheel velocity calculated section derives and corrects the target road wheel velocity $V_0$ in accordance with the correction signal C.

12. A driving force controlling apparatus for a vehicle, comprising:
   driver's demanding torque setting means for setting a torque that a vehicular driver is demanding;
   slip condition detecting means for detecting a slip condition of vehicular road wheels;
   target engine torque setting means for setting a target engine torque in accordance with the slip condition;
   driving force control execution determining means for determining whether the driving force control should be executed in accordance with the slip condition; and
   engine output torque determining means for giving a determination of an output torque developed by an engine of the vehicle on the basis of the driver's demanding torque and the target engine torque, the target engine torque setting means outputting a value of the target engine torque to which the driver's demanding torque is assigned when no driving force control is determined to be executed.

13. A driving force controlling method for a vehicle, comprising:
   setting a torque that a vehicular driver is demanding;
   detecting a slip condition of vehicular road wheels;
   setting a target engine torque in accordance with the slip condition;
   determining whether the driving force control should be executed in accordance with the slip condition; and
   giving a determination of an output torque developed by an engine of the vehicle on the basis of the driver's demanding torque and the target engine torque, wherein, at the target engine torque setting step, a value of the target engine torque to which the driver's demanding torque is assigned is outputted when no driving force control is determined to be executed at the driving force control determining step.

* * * * *

UNITED STATES PATENT AND TRADEMARK OFFICE
CERTIFICATE OF CORRECTION

PATENT NO.    : 6,308,127 B1
DATED         : October 23, 2001
INVENTOR(S)   : Hiroshi Tsunehara

It is certified that error appears in the above-identified patent and that said Letters Patent is hereby corrected as shown below:

<u>Title page,</u>
Item [30], Foreign Application Priority Data,
Please change "Jan. 27, 2000   (JP)…………..11-017534" to
-- Jan. 26, 1999   (JP)……………….11-017534 --

Signed and Sealed this

Sixteenth Day of July, 2002

Attest:

JAMES E. ROGAN
Attesting Officer    Director of the United States Patent and Trademark Office